March 28, 1950     A. CAUCHOIS     2,501,758

BAR GRIPPING CHUCK

Filed Dec. 15, 1948

Inventor
A. Cauchois

Patented Mar. 28, 1950

2,501,758

UNITED STATES PATENT OFFICE 2,501,758

BAR GRIPPING CHUCK

André Cauchois, Lille, France

Application December 15, 1948, Serial No. 65,341
In France December 24, 1947

2 Claims. (Cl. 279—70)

This invention relates to an improved bar gripping chuck to be provided on a rotary machine. The improvements provided according to the invention consist in the provision of flat jaws arranged to slide parallel to their axial plane in slide grooves provided along radial planes in a bi-conical ring having a shoulder on each side, the back of these jaws comprising conical chamfers engaging two conical surfaces of the same diameter, the one being fixed and the other one provided on a ring guided parallel to its longitudinal axis and approaching one another under the action of a screw-threaded ring or rod screwing into the central bore of the guided ring with the conical surface.

The jaws are provided with one or more recesses for the accommodation of the springs which separate them when the chuck is loosened.

The slide grooves may be continuous and in this case the separating springs form a resilient ring which abuts against the jaws or discontinuous and in this case each jaw is provided with its own spring which abuts against the part of the bi-conical ring provided between the parts of the slide groove.

The accompanying drawings illustrate diagrammatically and by way of example two forms of construction according to the invention.

Figure 1:
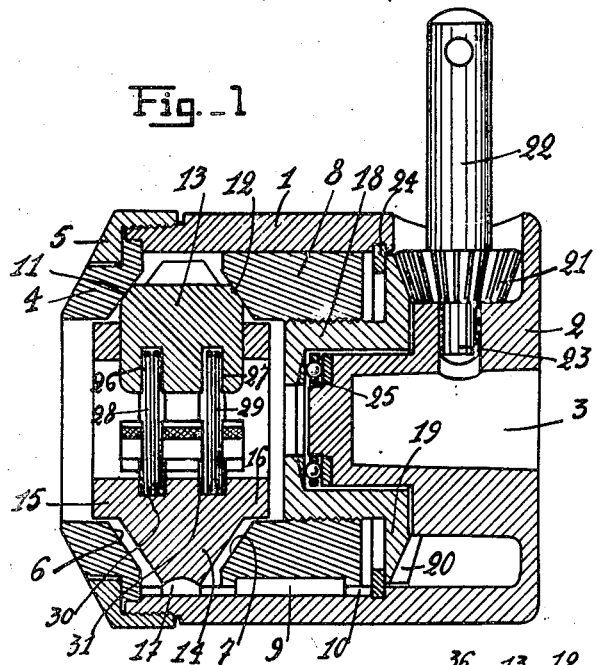
Figure 1 is a longitudinal section through the axis of the chuck in which each slide groove is continuous.
Figure 2:
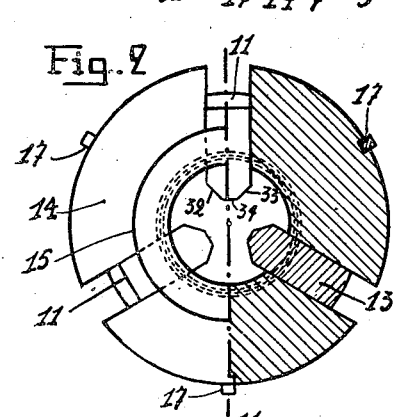
Figure 2 is a front view partly in section of the bi-conical ring with its jaws.

Referring to the drawings 1 is the body of the chuck the bottom of which is closed by a casting 2 comprising a conical opening 3 or the like for mounting on the machine. The body of the chuck is closed by a cap 4 kept in position by a screw-threaded ring 5; this cap is provided with an interior conical opening 6 cut at the same angle as the conical opening 7 of a ring 8 sliding longitudinally in the body of the chuck and the interior bore of which is screw-threaded. The ring 8 is guided longitudinally by one or more keys 9 integral therewith and sliding in grooves 10 provided in the interior bore of the chuck.

Between the conical openings 6 of the cap and 7 of the ring 8 lie the conical chamfers 11 and 12 of flat jaws 13 arranged to slide in slide grooves provided along radial planes in a bi-conical ring 14 provided with shoulders 15 and 16 sliding with weak friction in the interior bore of the cap 4 at one end and in the interior bore of the ring 8 at the other end. Keys 17 sliding also in the grooves 10 guide the bi-conical ring 14.

In the interiorly screw-threaded bore of the ring 8 there is screw-threaded a member 18 provided with a flange 19 the edges of which are provided with teeth 20 producing a conical gear with a pinion 21 provided on a key 22 the end 23 of which pivots in a socket provided at the bottom 2 of the chuck. The flange 19 of the member 18 is kept against the side of the head of the mandrel by a resilient ring or guard 24.

Between the end of the member 18 and the end of the head of the chuck there is provided a roller bearing 25.

Each jaw is provided with two recesses 26 and 27 in which are accommodated resilient rings 28 and 29 consisting, for instance, of two turns of a helical spring. These resilient rings abut against the jaws separating them when the chuck is being loosened; they also come to lie in the grooves 30 and 31 provided for this purpose in the bi-conical ring when the jaws are strongly separated.

As will be seen from the drawings the base of the jaws forming the grip is provided with two chamfers 32 and 33 leaving between them a flat surface 34 forming the gripping surface which may advantageously be fluted or vermiculated.

Figure 3:
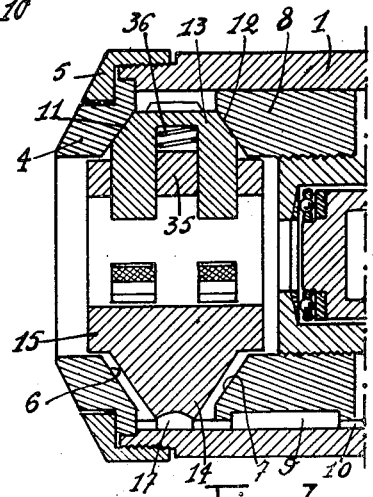
Figure 3 is a longitudinal section along the axis of part of the same chuck in which the slide grooves are discontinuous.
Figure 4:
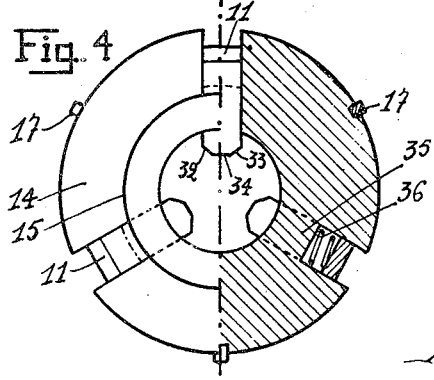
Figure 4 is a front view partly in section of the bi-conical ring provided with jaws according to the modification.

In the modification shown in Figures 3 and 4, the slide groove of each jaw is discontinuous and the part 35 serves as a support to the spring 36 which acts against the bottom of the recess in the jaw.

The chuck constructed according to the present invention has the following advantages: great gripping force, without the jaws overhanging; great precision owing to the ease by which the various members can be machined; large gripping surface of the jaws; and the obstacle to great gripping force is reduced.

It is to be understood that the shapes, details, primary materials and the various arrangements can be varied without departing from the scope of the invention. More particularly the guiding keys of the ring with conical opening may be integral with the head of the chuck and the ring provided with the grooves. Likewise, the bi-conical ring may be provided with notches for the passage of the guiding parts which would be fixed to the head of the chuck. The conical gear may be replaced by a cylindrical one.

I claim:

1. A bar-gripping chuck, comprising: a chuck body enclosing a fixed member having a conical recess, an internally screw-threaded ring capable of longitudinal movement within the chuck body and having a conical recess facing the conical recess of the fixed member and of the same dimensions as that recess, a ring having externally conical surfaces on both sides and guiding shoulders at both ends and radial slide grooves, flat jaws engaging in these slide grooves and capable of sliding radially therein, the jaws having conical chamfers abutting against the conical recesses of the fixed member and of the longitudinally movable ring, an externally screw-threaded member meshing with the internal screw thread of the longitudinally movable ring, and means for turning the externally screw-threaded member within this ring.

2. A bar-gripping chuck as claimed in claim 1, in which the jaws are bifurcated and the slide grooves are discontinuous, the chuck having a spring mounted in each jaw and abutting at one end against the jaw between its bifurcated limbs and at the other end against that part of the ring that carries the jaws and the springs which lies between the discontinued parts of the slide grooves, for the purpose of separating the jaws when the chuck is being loosened.

ANDRÉ CAUCHOIS.

REFERENCES CITED

The following references are of record in the file of this patent:

UNITED STATES PATENTS

| Number | Name | Date |
|---|---|---|
| 123,863 | Buckley | Feb. 20, 1872 |
| 823,545 | Petnelli | June 19, 1906 |
| 866,788 | Holstein | Sept. 24, 1907 |

FOREIGN PATENTS

| Number | Country | Date |
|---|---|---|
| 74,049 | Switzerland | Oct. 4, 1916 |